(12) United States Patent
Takami

(10) Patent No.: US 9,354,999 B2
(45) Date of Patent: May 31, 2016

(54) INFORMATION PROCESSING SYSTEM, INFORMATION PROCESSING APPARATUS, AND COMPUTER PROGRAM PRODUCT

(71) Applicant: Kana Takami, Kanagawa (JP)

(72) Inventor: Kana Takami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 191 days.

(21) Appl. No.: 14/193,890

(22) Filed: Feb. 28, 2014

(65) Prior Publication Data

US 2014/0258770 A1 Sep. 11, 2014

(30) Foreign Application Priority Data

Mar. 11, 2013 (JP) ................................. 2013-048367

(51) Int. Cl.
G06F 11/00 (2006.01)
G06F 11/30 (2006.01)
G06F 11/07 (2006.01)

(52) U.S. Cl.
CPC .......... *G06F 11/3013* (2013.01); *G06F 11/079* (2013.01); *G06F 11/0733* (2013.01); *G06F 11/3058* (2013.01)

(58) Field of Classification Search
CPC G06F 11/0733; G06F 11/079; G06F 11/3013
See application file for complete search history.

(56) References Cited

U.S. PATENT DOCUMENTS

| 5,138,618 | A  | * | 8/1992  | Honda     | G03G 15/5079 714/25  |
|-----------|----|---|---------|-----------|----------------------|
| 7,385,716 | B1 | * | 6/2008  | Skaanning | G06F 11/0733 358/1.14|
| 7,554,574 | B2 |   | 6/2009  | Shoji et al. |                   |
| 7,949,740 | B2 | * | 5/2011  | Scrafford | G06F 11/0733 358/1.15|
| 2003/0112452 | A1 | * | 6/2003 | McIntyre | G06F 11/0733 358/1.1 |
| 2004/0246520 | A1 | * | 12/2004 | Obert    | G03G 15/55 358/1.15 |
| 2005/0262394 | A1 | * | 11/2005 | Yasukawa | G06F 11/0733 714/23 |
| 2006/0242288 | A1 | * | 10/2006 | Masurkar | G06F 11/0709 709/223 |
| 2008/0126860 | A1 | * | 5/2008  | Sampath  | G06F 11/0733 714/25 |
| 2008/0174802 | A1 | * | 7/2008  | Sampath  | G03G 15/55 358/1.13 |
| 2011/0154097 | A1 | * | 6/2011  | Barlow   | G06F 11/0727 714/3 |
| 2012/0013936 | A1 | * | 1/2012  | Sawada   | G06K 15/402 358/1.14 |
| 2013/0145221 | A1 | * | 6/2013  | Kaneko   | H04L 41/12 714/48 |
| 2013/0169996 | A1 | * | 7/2013  | McLeod   | G06K 7/1092 358/3.28 |
| 2014/0324865 | A1 | * | 10/2014 | Mizutani | G06F 11/0703 707/737 |

FOREIGN PATENT DOCUMENTS

JP 2005-017874 1/2005

* cited by examiner

*Primary Examiner* — Joshua P Lottich
(74) *Attorney, Agent, or Firm* — Oblon, McClelland, Maier & Neustadt, L.L.P

(57) ABSTRACT

The system includes: an extracting part extracting one or more devices where the same phenomenon as occurred in a target device had occurred; an index-value calculating part acquiring device information of the target device and calculating an index value thereof, and acquiring pieces of device information of the devices and calculating index values thereof; a first-similarity calculating part calculating a first similarity between the index values of the target device and each of the devices; a second-similarity calculating part acquiring environment information of the target device and pieces of environment information of the devices, and calculating a second similarity between the environment informations of the target device and each of the devices; and a presuming part determining one or more reference devices based on the similarities, and presuming a replacement part of the target device based on replacement parts that the reference devices used for elimination of the phenomenon.

16 Claims, 9 Drawing Sheets

| PRODUCT NAME | SERIAL NUMBER | NUMBER OF PRINTED SHEETS | NUMBER OF OPERATING DAYS | ... |
|---|---|---|---|---|
| AAA | 11111111 | 10000 | 500 | ... |
| BBB | 22222222 | 50000 | 2000 | ... |
| CCC | 33333333 | 20000 | 1000 | ... |
| ⋮ | ⋮ | ⋮ | ⋮ | ⋮ |

FIG.5

| PROD-UCT NAME | SERIAL NUMBER | DATE CON-FIRMED | DATE OF WORK | CLASSIFI-CATION | PHENOM-ENON | CAUSE | POINT | REPLACE-MENT PART ID |
|---|---|---|---|---|---|---|---|---|
| AAA | 11111111 | 10/1/2012 | 10/2/2012 | FAILURE | COLOR SHADING | DETERIO-RATION OF PART | WRITING UNIT | 10 |
| BBB | 22222222 | 10/15/2012 | 10/17/2012 | FAILURE | COLOR SHADING | DETERIO-RATION OF PART | WRITING UNIT | 10 |
| CCC | 33333333 | 12/1/2012 | 12/2/2012 | FAILURE | COLOR SHADING | DETERIO-RATION OF PART | WRITING UNIT | 11 |
| ⋮ | ⋮ | ⋮ | ⋮ | ⋮ | ⋮ | ⋮ | ⋮ | ⋮ |

FIG.6

| PRODUCT NAME | SERIAL NUMBER | PLACE | TEMPER-ATURE [°C] | HUMIDITY [%] | TYPE OF INDUSTRY | ... |
|---|---|---|---|---|---|---|
| AAA | 11111111 | OFFICE | 20 | 50 | FINANCIAL INDUSTRY | ... |
| BBB | 22222222 | FACTORY | 30 | 70 | MANUFACTURING INDUSTRY | ... |
| CCC | 33333333 | OFFICE | 15 | 40 | SERVICE INDUSTRY | ... |
| ⋮ | ⋮ | ⋮ | ⋮ | ⋮ | ⋮ | ⋮ |

FIG.7

| RANKING | REPLACEMENT PART ID | PART NAME | PERCENTAGE |
|---|---|---|---|
| 1 | 0001 | XXX | 50% |
| 2 | 0002 | YYY | 30% |
| 3 | 0003 | ZZZ | 20% |

| PART NAME | PART ID | QUANTITY OF STOCK | | | |
|---|---|---|---|---|---|
| | | SERVICE OFFICE A | SERVICE OFFICE B | ... | TOTAL |
| WRITING UNIT | 10 | 0 | 0 | ... | 0 |
| WRITING UNIT | 11 | 2 | 3 | ... | 10 |
| ⋮ | ⋮ | ⋮ | ⋮ | ⋮ | ⋮ |

| REPLACEMENT PART ID | PART NAME | QUANTITY OF STOCK | DETAILS | |
|---|---|---|---|---|
| 0 | XXX | 50 | SERVICE OFFICE | 20 |
| | | | SERVICE OFFICE A | 30 |
| | | | SERVICE OFFICE B | 0 |
| ⋮ | ⋮ | ⋮ | ⋮ | ⋮ |

INFORMATION PROCESSING SYSTEM, INFORMATION PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2013-048367 filed in Japan on Mar. 11, 2013.

BACKGROUND OF THE INVENTION

1. Field of the Invention

The present invention relates to an information processing system, an information processing apparatus, and a computer program product.

2. Description of the Related Art

Conventionally, to shorten the downtime of a device introduced in a client environment, such as an image forming apparatus or an image projection apparatus, has been required to prevent stagnation of client's work.

For example, in Japanese Patent Application Laid-open No. 2005-017874, there is disclosed a technology to predict the occurrence of failure in an image forming apparatus and perform maintenance work beforehand, thereby reducing the downtime of the image forming apparatus.

Such conventional technologies as described above reduce the downtime of a device by avoiding the occurrence of failure; however, on the occurrence of failure, the conventional technologies cannot contribute to reducing the downtime due to the failure.

In view of the above situation, there is a need to provide an information processing system, an information processing apparatus, and a computer program product capable of suppressing the downtime due to a phenomenon occurred in a device.

SUMMARY OF THE INVENTION

It is an object of the present invention to at least partially solve the problems in the conventional technology.

According to the present invention, there is provided an information processing system comprising: an extracting part configured to extract one or more devices in which the same phenomenon as that occurred in a maintenance target device had occurred from multiple managed object devices; an index-value calculating part configured to acquire device information on a device state of the maintenance target device and to calculate an index value regarding the device state of the maintenance target device, and to acquire pieces of device information on respective device states of the one or more devices and to calculate index values regarding the respective device states of the one or more devices; a first-similarity calculating part configured to calculate a first similarity between the index value of the maintenance target device and the index value of each of the one or more devices; a second-similarity calculating part configured to acquire environment information on a usage environment of the maintenance target device and pieces of environment information on respective usage environments of the one or more devices, and to calculate a second similarity between the environment information of the maintenance target device and the environment information of each of the one or more devices; and a presuming part configured to determine one or more reference devices from among the one or more devices on the basis of the first and second similarities, and to presume a replacement part of the maintenance target device on the basis of replacement parts that the one or more reference devices used for elimination of the phenomenon.

The present invention also provides an information processing apparatus comprising: an extracting part configured to extract one or more devices in which the same phenomenon as that occurred in a maintenance target device had occurred from multiple managed object devices; an index-value calculating part configured to acquire device information on a device state of the maintenance target device and to calculate an index value regarding the device state of the maintenance target device, and to acquire pieces of device information on respective device states of the one or more devices and to calculate index values regarding the respective device states of the one or more devices; a first-similarity calculating part configured to calculate a first similarity between the index value of the maintenance target device and the index value of each of the one or more devices; a second-similarity calculating part configured to acquire environment information on a usage environment of the maintenance target device and pieces of environment information on respective usage environments of the one or more devices, and to calculate a second similarity between the environment information of the maintenance target device and the environment information of each of the one or more devices; and a presuming part configured to determine one or more reference devices from among the one or more devices on the basis of the first and second similarities, and to presume a replacement part of the maintenance target device on the basis of replacement parts that the one or more reference devices used for elimination of the phenomenon.

The present invention also provides a computer program product comprising a non-transitory computer-readable recording medium having a computer program causing a computer to function as: an extracting part configured to extract one or more devices in which the same phenomenon as that occurred in a maintenance target device had occurred from multiple managed object devices; an index-value calculating part configured to acquire device information on a device state of the maintenance target device and to calculate an index value regarding the device state of the maintenance target device, and to acquire pieces of device information on respective device states of the one or more devices and to calculate index values regarding the respective device states of the one or more devices; a first-similarity calculating part configured to calculate a first similarity between the index value of the maintenance target device and the index value of each of the one or more devices; a second-similarity calculating part configured to acquire environment information on a usage environment of the maintenance target device and pieces of environment information on respective usage environments of the one or more devices, and to calculate a second similarity between the environment information of the maintenance target device and the environment information of each of the one or more devices; and a presuming part configured to determine one or more reference devices from among the one or more devices on the basis of the first and second similarities, and to presume a replacement part of the maintenance target device on the basis of replacement parts that the one or more reference devices used for elimination of the phenomenon.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram showing an example of maintenance information according to the first embodiment;

FIG. 6 is a diagram showing an example of environment information according to the first embodiment;

FIG. 7 is a diagram showing a display example of presumed replacement parts according to the first embodiment;

DETAILED DESCRIPTION OF THE PREFERRED EMBODIMENTS

Exemplary embodiments of an information processing system, an information processing apparatus, and a computer program product according to the present invention will be explained in detail below with reference to accompanying drawings.

First Embodiment

First, a configuration of an information processing system according to a first embodiment is explained.

Figure 1:
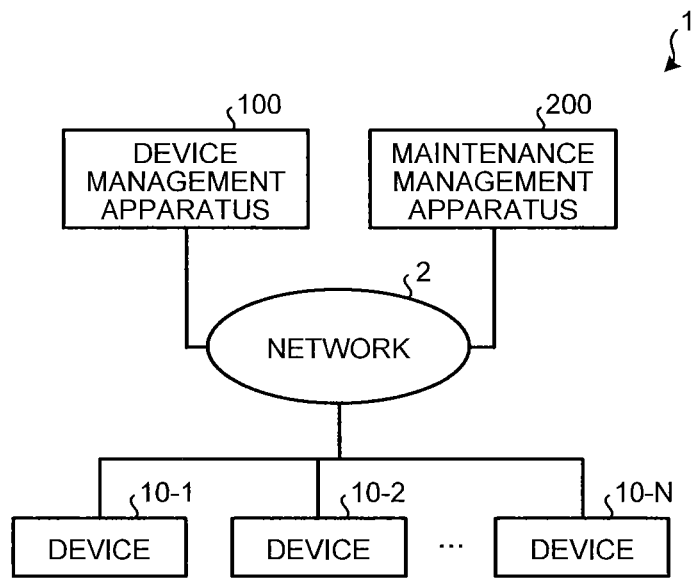
FIG. 1 is a block diagram showing an example of a configuration of an information processing system according to a first embodiment.

FIG. 1 is a block diagram showing an example of a configuration of an information processing system 1 according to the first embodiment. As shown in FIG. 1, the information processing system 1 includes devices 10-1 to 10-N (N≥2), a device management apparatus 100, and a maintenance management apparatus 200. The devices 10-1 to 10-N, the device management apparatus 100, and the maintenance management apparatus 200 are connected via a network 2. The network 2 can be realized by, for example, the Internet or a local area network (LAN), etc.

In the first embodiment, the device management apparatus 100 and the maintenance management apparatus 200 shall be installed in a service center of a service providing company which provides device management service, and the devices 10-1 to 10-N shall be installed in a service point. A service point is an area in which a managed object device is installed, and corresponds to, for example, a business place or office of a company which receives the device management service.

However, the installation place of the device management apparatus 100 is not limited to the service center, and can be the service point. Furthermore, the device management apparatus 100 and the maintenance management apparatus 200 can be installed in different service centers. Moreover, all the devices 10-1 to 10-N do not have to be installed in the same service point, and the devices 10-1 to 10-N can be installed in different service points.

The devices 10-1 to 10-N can be any types of devices as long as the devices can be connected to the network 2, and include, for example, image forming apparatuses such as a printer, a copier, a multifunction peripheral (MFP), a scanner device, and a facsimile device, various electronic devices such as a projector, a camera, an air conditioner, a refrigerator, a fluorescent light, a vending machine, and a handheld terminal, a PC, and a tablet computer, etc. An MFP is a device having at least two functions out of a copy function, a print function, a scanner function, and a facsimile function. In the first embodiment, the devices 10-1 to 10-N shall be MFPs; however, types of the devices 10-1 to 10-N are not limited to this.

The device management apparatus 100 manages device information of the devices 10-1 to 10-N which are managed object devices, and can be realized by a computer or the like in which a device management program has been installed.

Figure 2:
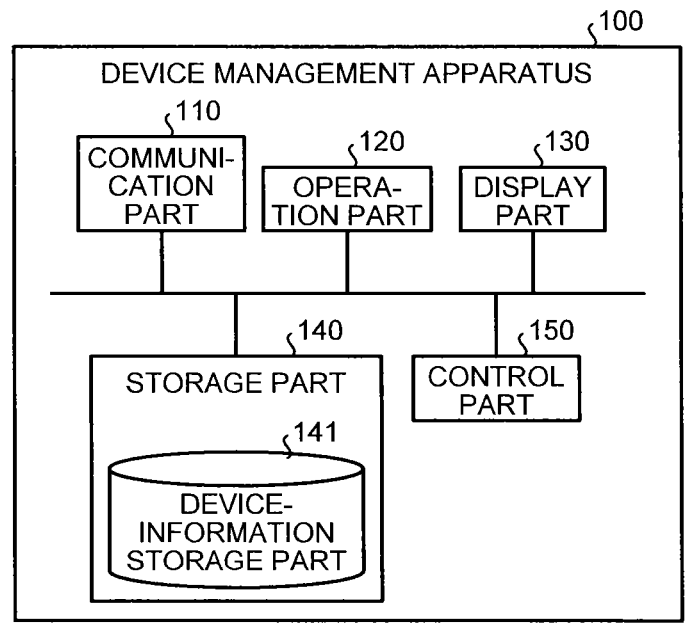
FIG. 2 is a block diagram showing an example of a configuration of a device management apparatus according to the first embodiment.

FIG. 2 is a block diagram showing an example of a configuration of the device management apparatus 100 according to the first embodiment. As shown in FIG. 2, the device management apparatus 100 includes a communication part 110, an operation part 120, a display part 130, a storage part 140, and a control part 150.

The communication part 110 communicates with external devices, such as the devices 10-1 to 10-N and the maintenance management apparatus 200, via the network 2, and can be realized by a communication device such as a network interface card (NIC).

The operation part 120 is a device through which inputs of various operations are made, and can be realized by an input device such as a keyboard, a mouse, a touchpad, or a touch panel.

The display part 130 displays thereon various screens, and can be realized by a display device such as a liquid crystal display or a touch panel display.

The storage part 140 stores therein various programs, such as the device management program, executed by the device management apparatus 100 and data used in various processes performed by the device management apparatus 100. The storage part 140 can be realized by at least any of a magnetically-recordable storage device, an optically-recordable storage device, and an electrically-recordable storage device, such as a hard disk drive (HDD), a solid state drive (SSD), a memory card, an optical disk, and a random access memory (RAM). The storage part 140 includes a device-information storage part 141.

The device-information storage part 141 stores therein device information of the devices 10-1 to 10-N. The device information can be any kind of information as long as the information pertains to a device state of a device; however, the device information preferably includes at least the number of printed sheets and the number of operating days.

Figures 3, 4:
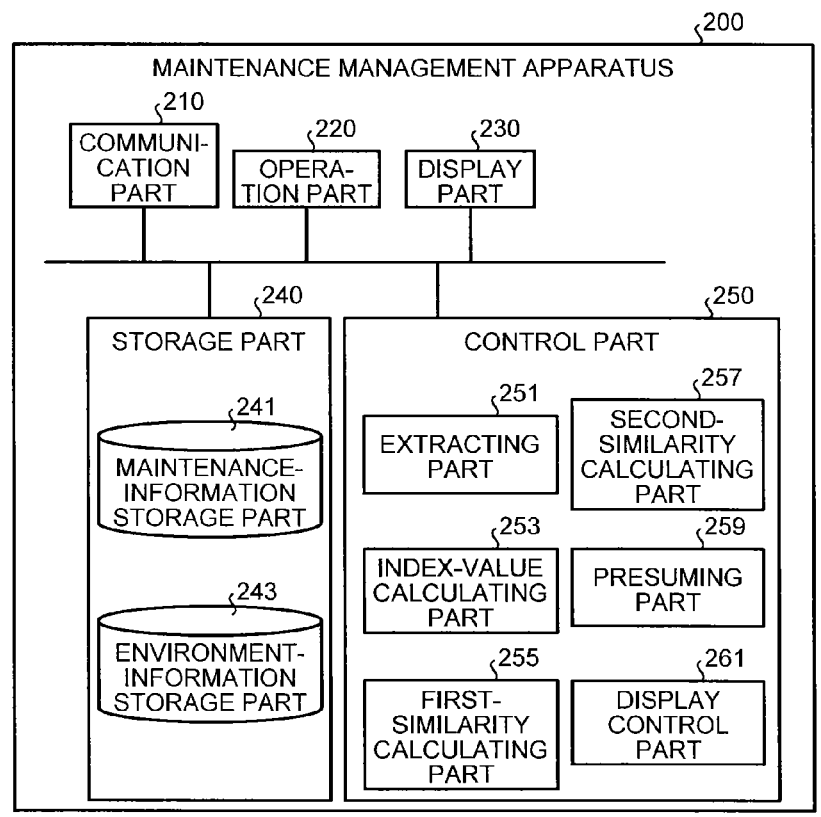
FIG. 3 is a diagram showing an example of device information according to the first embodiment.
FIG. 4 is a block diagram showing an example of a configuration of a maintenance management apparatus according to the first embodiment.

FIG. 3 is a diagram showing an example of the device information according to the first embodiment. In the example shown in FIG. 3, the device information is collections of records (columns) in which a product name, a serial number, the number of printed sheets, and the number of operating days, etc. are associated. The product name denotes a name of a device. The serial number denotes an identifier for identifying the device. The number of printed sheets denotes the number of sheets printed by the device. The number of operating days denotes the number of days that the device has been operating since it was installed.

The control part 150 controls the parts included in the device management apparatus 100, and can be realized by a control device such as a central processing unit (CPU). The control part 150 manages the device information of the devices 10-1 to 10-N by using the device-information storage part 141.

For example, the control part 150 acquires device information from the devices 10-1 to 10-N through the communication part 110, and, if the acquired device information is device information of a new device, stores the device information in the device-information storage part 141; if the acquired device information is device information of an existing device, updates device information stored in the device-information storage part 141 with the acquired device information.

Specifically, the control part 150 acquires device information by performing communication using a general-purpose protocol commonly used in device management, such as a Simple Network Management Protocol (SNMP), with the devices 10-1 to 10-N. Incidentally, as a method of acquiring device information, the control part 150 can voluntarily acquire device information from the devices 10-1 to 10-N, or the devices 10-1 to 10-N can voluntarily inform the device management apparatus 100 (the control part 150) of device information.

Furthermore, upon receipt of a request for device information of any of the devices 10-1 to 10-N from the maintenance management apparatus 200, the control part 150 acquires the requested device information from the device-information storage part 141 and returns the acquired device information to the maintenance management apparatus 200. For example, when a serial number has been input from the maintenance management apparatus 200 through the communication part 110, the control part 150 acquires a record of device information including the serial number from the device information stored in the device-information storage part 141 and returns the acquired device information to the maintenance management apparatus 200.

The maintenance management apparatus 200 manages maintenance information on maintenance which has been performed on the devices 10-1 to 10-N, and can be realized by a PC or the like in which a maintenance management program has been installed.

FIG. 4 is a block diagram showing an example of a configuration of the maintenance management apparatus 200 according to the first embodiment. As shown in FIG. 4, the maintenance management apparatus 200 includes a communication part 210, an operation part 220, a display part 230, a storage part 240, and a control part 250.

The communication part 210 communicates with an external device, such as the device management apparatus 100, via the network 2, and can be realized by an NIC or the like.

The operation part 220 is a device through which inputs of various operations are made, and can be realized by an input device such as a keyboard, a mouse, a touchpad, or a touch panel.

The display part 230 displays thereon various screens, and can be realized by a display device such as a liquid crystal display or a touch panel display.

The storage part 240 stores therein various programs, such as the maintenance management program, executed by the maintenance management apparatus 200 and data used in various processes performed by the maintenance management apparatus 200. The storage part 240 can be realized by at least any of a magnetically-recordable storage device, an optically-recordable storage device, and an electrically-recordable storage device, such as an HDD, an SSD, a memory card, an optical disk, and a RAM. The storage part 240 includes a maintenance-information storage part 241 and an environment-information storage part 243.

The maintenance-information storage part 241 stores therein maintenance information (tickets) on maintenance which has been performed on the devices 10-1 to 10-N. The maintenance information can be any kind of information as long as the information pertains to maintenance on a device; however, the maintenance information preferably includes at least device identifying information for identifying a device, phenomenon information indicating a phenomenon occurred in the device, and replacement-part identifying information for identifying a replacement part which was used for elimination of the phenomenon.

FIG. 5 is a diagram showing an example of the maintenance information according to the first embodiment. In the example shown in FIG. 5, the maintenance information is collections of records (columns) in which a product name, a serial number, the date confirmed, the date of work, classification, a phenomenon, a cause, a point, and a replacement part ID, etc. are associated. The product name denotes a name of a device on which maintenance was performed. The serial number (an example of device identifying information) denotes an identifier for identifying the device on which the maintenance was performed. The date confirmed denotes the date on which a phenomenon to be described later was confirmed through the maintenance. The date of work denotes the date on which work for elimination of the phenomenon confirmed through the maintenance was performed. The classification denotes classification of the maintenance, and includes failure and periodic inspection, etc. The phenomenon (an example of phenomenon information) denotes content of the phenomenon confirmed through the maintenance. The cause denotes a cause of generation of the phenomenon confirmed through the maintenance. The point denotes a point of the device where the phenomenon confirmed through the maintenance was generated. The replacement part ID (an example of replacement-part identifying information) denotes an ID of a replacement part in the case where a part was replaced for elimination of the phenomenon confirmed through the maintenance.

The environment-information storage part 243 stores therein environment information on usage environments of the devices 10-1 to 10-N. The environment information can be any kinds of information as long as the information pertains to a usage environment of a device; however, the environment information preferably includes at least either temperature or humidity in the usage environment.

FIG. 6 is a diagram showing an example of the environment information according to the first embodiment. In the example shown in FIG. 6, the environment information is collections of records (columns) in which a product name, a serial number, place, temperature (° C.), humidity (%), and a type of industry, etc. are associated. The product name denotes a name of a device. The serial number denotes an identifier for identifying the device. The place denotes an installation place of the device. The temperature (° C.) denotes temperature in the installation place of the device. The humidity (%) denotes humidity in the installation place of the device. The type of industry denotes a type of client's industry who owns the device.

The control part 250 controls the parts included in the maintenance management apparatus 200, and can be realized by a control device such as a CPU.

The control part 250 manages the maintenance information of the devices 10-1 to 10-N by using the maintenance-information storage part 241. For example, when new maintenance information or update of existing maintenance information has been input by an administrator of the maintenance management apparatus 200 through the operation part 220, thereby a ticket has been issued or closed, the control part 250 updates the maintenance information stored in the maintenance-information storage part 241.

Furthermore, the control part 250 manages the environment information of the devices 10-1 to 10-N by using the environment-information storage part 243. For example, when new environment information or update of existing environment information has been input by the administrator of the maintenance management apparatus 200 through the operation part 220, the control part 250 updates the environment information stored in the environment-information storage part 243.

Then, using the maintenance information stored in the maintenance-information storage part 241, the environment information stored in the environment-information storage part 243, and the device information managed by the device management apparatus 100, the control part 250 presumes a replacement part for elimination of failure occurred in a maintenance target device. Incidentally, the maintenance target device is any of the devices 10-1 to 10-N which are managed object devices. The control part 250 includes an extracting part 251, an index-value calculating part 253, a first-similarity calculating part 255, a second-similarity calculating part 257, a presuming part 259, and a display control part 261. The control part 250 starts (executes) the maintenance management program stored in the storage part 240, thereby the extracting part 251, the index-value calculating part 253, the first-similarity calculating part 255, the second-similarity calculating part 257, the presuming part 259, and the display control part 261 are implemented as software.

The extracting part 251 extracts one or more devices in which the same phenomenon as that occurred in a maintenance target device had occurred from the devices 10-1 to 10-N which are managed object devices. Specifically, by reference to the maintenance information stored in the maintenance-information storage part 241, the extracting part 251 extracts a device indicated by device identifying information associated with phenomenon information indicating the same phenomenon as that occurred in the maintenance target device as the one or more devices.

For example, when a phenomenon occurred in the maintenance target device has been input by the administrator of the maintenance management apparatus 200 through the operation part 220, the extracting part 251 acquires a record including the same phenomenon as the input phenomenon by reference to the maintenance information, and extracts a serial number included in the acquired record. Thus, the extracting part 251 extracts one or more devices in which the same phenomenon as that occurred in the maintenance target device had occurred.

The index-value calculating part 253 acquires device information of the maintenance target device, and calculates an index value regarding a device state of the maintenance target device. Likewise, the index-value calculating part 253 acquires respective pieces of device information of the one or more devices extracted by the extracting part 251, and calculates index values regarding respective device states of the one or more devices.

Specifically, the index-value calculating part 253 acquires device information of the maintenance target device and respective pieces of device information of the one or more devices from the device-information storage part 141 of the device management apparatus 100. For example, the index-value calculating part 253 transmits the serial number of the maintenance target device input by the administrator of the maintenance management apparatus 200 through the operation part 220 and the serial numbers of the one or more devices extracted by the extracting part 251 to the device management apparatus 100 through the communication part 210, and acquires records of device information including these serial numbers from the device management apparatus 100.

In the calculation of an index value, a publicly-known method, such as a method disclosed in Japanese Patent Application Laid-open No. 2005-017874, can be used. For example, the index-value calculating part 253 defines multi-dimensional space in which different coordinate axes are set for elements (especially, the number of printed sheets and the number of operating days) included in device information, and calculates a distance in the multidimensional space as an index value.

The first-similarity calculating part 255 calculates a first similarity which is the degree of similarity between the index value of the maintenance target device and the index value of each of the one or more devices which have been calculated by the index-value calculating part 253. The first similarity denotes the degree of similarity in device state between the maintenance target device and each of the one or more devices. As a method for the calculation of a first similarity, a publicly-known similarity calculating method, such as a method using a Euclidean distance, can be used.

The second-similarity calculating part 257 acquires environment information of the maintenance target device and respective pieces of environment information of the one or more devices, and calculates a second similarity which is the degree of similarity between the environment information of the maintenance target device and the environment information of each of the one or more devices.

Specifically, the second-similarity calculating part 257 acquires environment information of the maintenance target device and respective pieces of environment information of the one or more devices from the environment-information storage part 243. For example, the second-similarity calculating part 257 acquires a record of environment information including the serial number of the maintenance target device input by the administrator of the maintenance management apparatus 200 through the operation part 220 and records of environment information including the serial numbers of the one or more devices extracted by the extracting part 251 from the environment-information storage part 243.

The second similarity denotes the degree of similarity in usage environment between the maintenance target device and each of the one or more devices. As a method for the calculation of a second similarity, a publicly-known similarity calculating method, such as a method using a Euclidean distance, can be used. Incidentally, the second-similarity calculating part 257 can calculate a second similarity specific to temperature or humidity, etc. included in the environment information, or can calculate a second similarity as a similarity in index value by calculating index values from the environment information in a manner as described above.

The presuming part 259 determines one or more reference devices from among the one or more devices on the basis of the first similarity calculated by the first-similarity calculating part 255 and the second similarity calculated by the second-similarity calculating part 257. Then, the presuming part 259 presumes a replacement part of the maintenance target device on the basis of replacement parts that the determined one or more reference devices used for elimination of the same phenomenon as that occurred in the maintenance target device. Specifically, by reference to the maintenance information, the presuming part 259 presumes a replacement part of the maintenance target device on the basis of replacement parts indicated by pieces of replacement-part identifying information associated with respective pieces of device identifying information indicating the one or more reference devices.

In the present embodiment, the presuming part 259 determines one or more reference devices from among the one or more devices on the basis of a weighted average value of the first and second similarities. Specifically, the presuming part 259 determines a predetermined number of devices having a high weighted average value among the one or more devices to be one or more reference devices.

Incidentally, a weight on the first similarity shall be greater than a weight on the second similarity. This is because when one compares device state and usage environment of a device, the device state is higher in the degree of influence on a phenomenon occurring in the device. Therefore, in the present embodiment, a weight on the similarity in device state (the first similarity) is set to be greater than a weight on the similarity in usage environment of a device (the second similarity). For example, when a weight on the first similarity is 0.7, and a weight on the second similarity is 0.3, a weighted average value of the first and second similarities is obtained by (first similarity×0.7)+(second similarity×0.3).

However, information used in the determination of the one or more reference devices is not limited to the weighted average value of the first and second similarities; alternatively, various different values based on the first and second similarities, such as an average value of the first and second similarities and a total value of the first and second similarities, can be used.

Incidentally, in the present embodiment, it is assumed that the weight on the first similarity and the weight on second similarity have been defined in the maintenance management program or stored in the storage part 240 in advance; however, the weights on the first and second similarities can be changed on the basis of input through the operation part 220.

Then, the presuming part 259 presumes a predetermined number of replacement parts having a high frequency of appearance among replacement parts that the determined one or more reference devices used for elimination of the same phenomenon as that occurred in the maintenance target device to be replacement parts of the maintenance target device.

For example, the presuming part 259 acquires records including serial numbers of the one or more reference devices by reference to the maintenance information, and, with respect to each of values of replacement part IDs included in the acquired records, counts the number of records including the same value of replacement part ID, and then ranks (arranges) the replacement part IDs in descending order of a count value. Incidentally, the serial numbers of the one or more reference devices can be identified from the serial numbers of the one or more devices extracted by the extracting part 251.

Thus, the replacement part IDs of replacement parts that the one or more reference devices used for elimination of the same phenomenon as that occurred in the maintenance target device are arranged in descending order of the frequency of appearance, so that the presuming part 259 presumes replacement parts indicated by a predetermined number of replacement part IDs having a high frequency of appearance to be replacement parts of the maintenance target device.

The display control part 261 displays information about the replacement parts presumed by the presuming part 259 on the display part 230. Consequently, the administrator of the maintenance management apparatus 200 can be informed of the presumed replacement parts of the maintenance target device.

Incidentally, the information about the replacement parts is preferably information capable of identifying the replacement parts, such as replacement part IDs or part names of the replacement parts. Furthermore, the percentage of each presumed replacement part to the whole replacement parts that the one or more reference devices used for elimination of the same phenomenon as that occurred in the maintenance target device can be included in the information about the replacement parts.

FIG. 7 is a diagram showing a display example of the presumed replacement parts according to the first embodiment. In the example shown in FIG. 7, the display control part 261 displays, as the information about the replacement parts presumed by the presuming part 259, appearance frequency ranking of replacement part IDs, replacement part IDs, part names of replacement parts, and the percentage of each presumed replacement part to the whole replacement parts, etc. on the display part 230.

Subsequently, the operation of the information processing system according to the first embodiment is explained.

Figure 8:
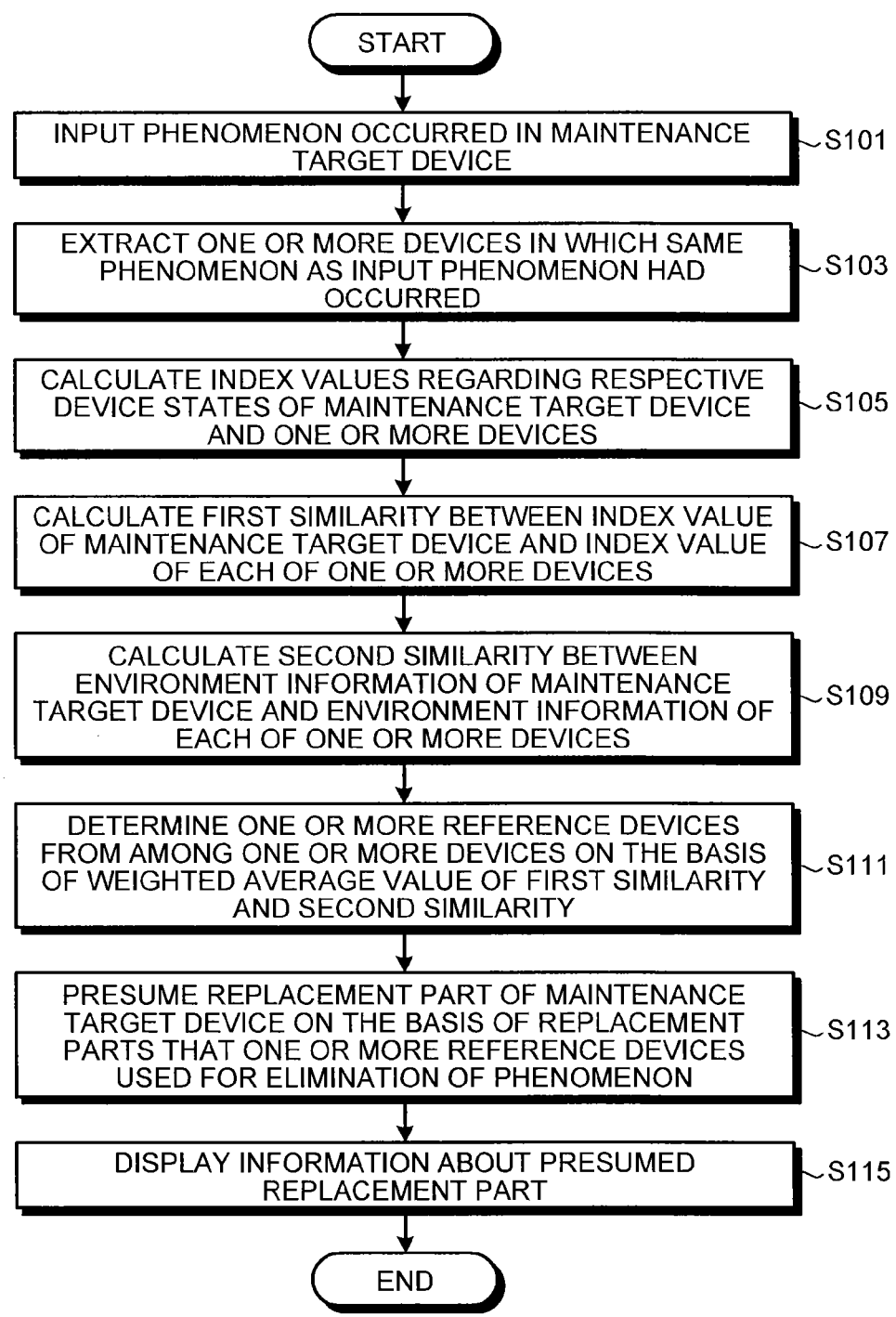
FIG. 8 is a flowchart showing an example of a process performed by the information processing system according to the first embodiment.

FIG. 8 is a flowchart showing an example of a process performed by the information processing system 1 according to the first embodiment.

First, the extracting part 251 receives a phenomenon occurred in a maintenance target device and a serial number, etc. which have been input by the administrator of the maintenance management apparatus 200 through the operation part 220 (Step S101).

Then, the extracting part 251 acquires a record including the same phenomenon as the input phenomenon by reference to the maintenance information stored in the maintenance-information storage part 241, and extracts a serial number included in the acquired record. Thus, the extracting part 251 extracts one or more devices in which the same phenomenon as that occurred in the maintenance target device had occurred (Step S103).

Then, the index-value calculating part 253 acquires respective pieces of device information of the maintenance target device and the one or more devices extracted by the extracting part 251 from the device management apparatus 100, and calculates index values regarding respective device states of the maintenance target device and the extracted one or more devices (Step S105).

Then, the first-similarity calculating part 255 calculates a first similarity between the index value of the maintenance target device and the index value of each of the one or more devices which have been calculated by the index-value calculating part 253 (Step S107).

Then, the second-similarity calculating part 257 acquires respective pieces of environment information of the maintenance target device and the one or more devices from the environment-information storage part 243, and calculates a second similarity between the acquired environment information of the maintenance target device and the acquired environment information of each of the extracted one or more devices (Step S109).

Then, the presuming part 259 determines one or more reference devices from among the extracted one or more devices on the basis of a weighted average value of the first similarity calculated by the first-similarity calculating part 255 and the second similarity calculated by the second-similarity calculating part 257 (Step S111).

Then, the presuming part 259 presumes a replacement part of the maintenance target device on the basis of replacement parts that the determined one or more reference devices used for elimination of the same phenomenon as that occurred in the maintenance target device (Step S113).

Then, the display control part 261 displays information about the replacement part presumed by the presuming part 259 on the display part 230 (Step S115).

As described above, in the first embodiment, one or more reference devices are determined from among one or more devices in which the same phenomenon as that occurred in a maintenance target device had occurred on the basis of a similarity in device state (a first similarity) to the maintenance target device and a similarity in usage environment of a device (a second similarity) to the maintenance target device, and a replacement part of the maintenance target device is presumed on the basis of replacement parts that the determined one or more reference devices used for elimination of the phenomenon.

In this way, in the first embodiment, one or more reference devices which are similar in device state and usage environment to a maintenance target device are determined from among one or more devices in which the same phenomenon as that occurred in the maintenance target device had occurred, and a replacement part of the maintenance target device is presumed on the basis of replacement parts that the determined one or more reference devices used for elimination of the phenomenon; therefore, it is possible to presume a replacement part for elimination of the phenomenon occurred in the maintenance target device with high accuracy.

Consequently, according to the first embodiment, a replacement part for elimination of a phenomenon occurred in a maintenance target device can be presumed with high accuracy without a serviceman having to make a detailed analysis of the phenomenon occurred in the maintenance target device, and the maintenance target device can be restored early; therefore, it is possible to suppress the downtime due to the phenomenon occurred in the maintenance target device.

In general, in the case where failure or the like occurred in a device, a serviceman goes to a service point, and checks a phenomenon in the device, identifies a cause of the failure, and determines a measure, and, if it is necessary to replace a part, the serviceman again goes to the service point and replaces the part. Especially, in the case of an image forming apparatus such as a copier, big bulky parts, such as a photo-receptor, a developing part, and a fixing roller, are often replaced; therefore, it is unrealistic that the serviceman carries all possible replacement parts to the service point.

On the other hand, in the first embodiment, a replacement part for elimination of failure occurred in a device can be presumed with high accuracy without a serviceman having to make a detailed analysis; therefore, the serviceman just carries the presumed replacement part to a service point from the beginning, so that the number of serviceman's visits to the service point can be reduced. As a result, early restoration of a device is possible, and therefore it is possible to suppress the downtime due to a phenomenon occurred in the device and also possible to reduce the serviceman workload.

Second Embodiment

In a second embodiment, there is explained an example where a replacement part is presumed by further using stock information. Points of difference from the first embodiment are mainly explained below, and a component having the same function as in the first embodiment is assigned the same name and reference numeral as in the first embodiment, and description of the component is omitted.

Figure 9:
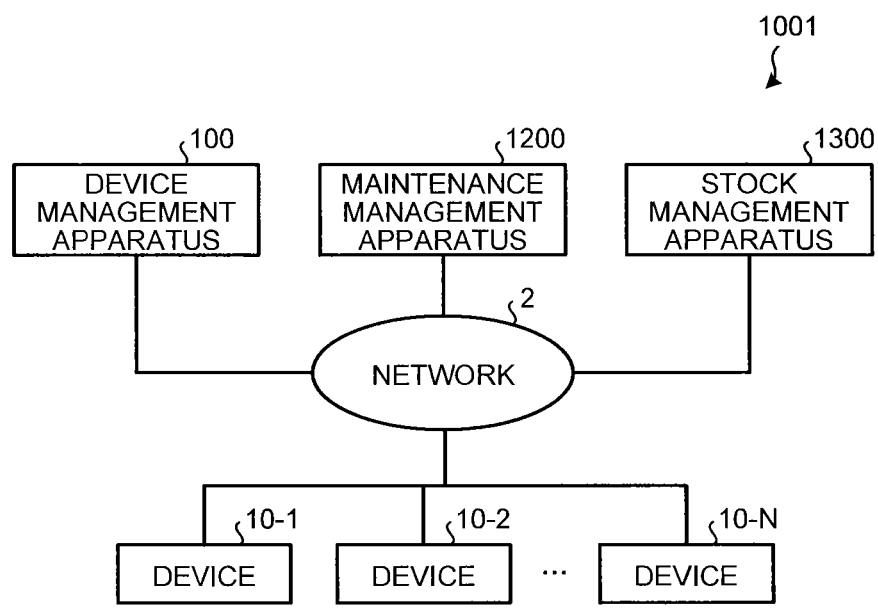
FIG. 9 is a block diagram showing an example of a configuration of an information processing system according to a second embodiment.

FIG. 9 is a block diagram showing an example of a configuration of an information processing system 1001 according to the second embodiment. As shown in FIG. 9, the information processing system 1001 according to the second embodiment differs from the information processing system 1 according to the first embodiment in that the information processing system 1001 further includes a stock management apparatus 1300 and includes a maintenance management apparatus 1200 instead of the maintenance management apparatus 200.

The stock management apparatus 1300 manages the stock of replacement parts, and can be realized by a computer or the like in which a stock management program has been installed. The stock management apparatus 1300 is connected to the maintenance management apparatus 1200 via the network 2.

Figure 10:
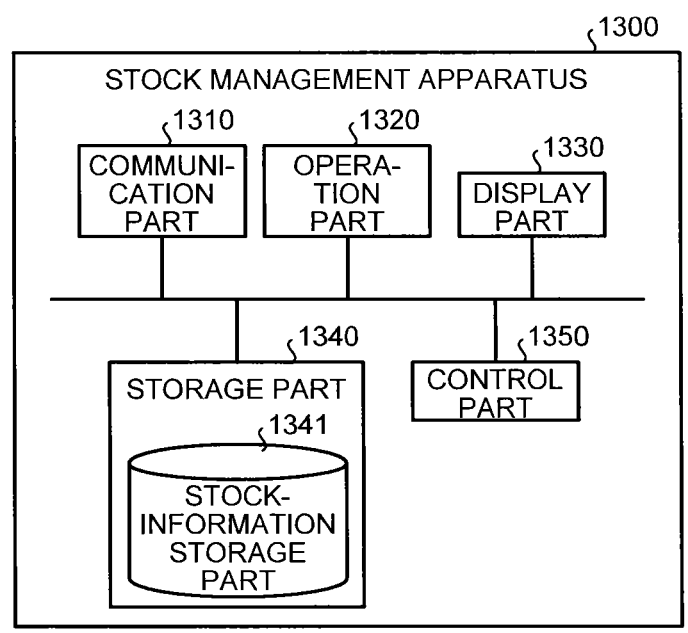
FIG. 10 is a block diagram showing an example of a configuration of a stock management apparatus according to the second embodiment.

FIG. 10 is a block diagram showing an example of a configuration of the stock management apparatus 1300 according to the second embodiment. As shown in FIG. 10, the stock management apparatus 1300 includes a communication part 1310, an operation part 1320, a display part 1330, a storage part 1340, and a control part 1350.

The communication part 1310 communicates with an external device, such as the maintenance management apparatus 1200, via the network 2, and can be realized by an NIC or the like.

The operation part 1320 is a device through which inputs of various operations are made, and can be realized by an input device such as a keyboard, a mouse, a touchpad, or a touch panel.

The display part 1330 displays thereon various screens, and can be realized by a display device such as a liquid crystal display or a touch panel display.

The storage part 1340 stores therein various programs, such as the stock management program, executed by the stock management apparatus 1300 and data used in various processes performed by the stock management apparatus 1300. The storage part 1340 can be realized by at least any of a magnetically-recordable storage device, an optically-recordable storage device, and an electrically-recordable storage device, such as an HDD, an SSD, a memory card, an optical disk, and a RAM. The storage part 1340 includes a stock-information storage part 1341.

Figures 11, 12:
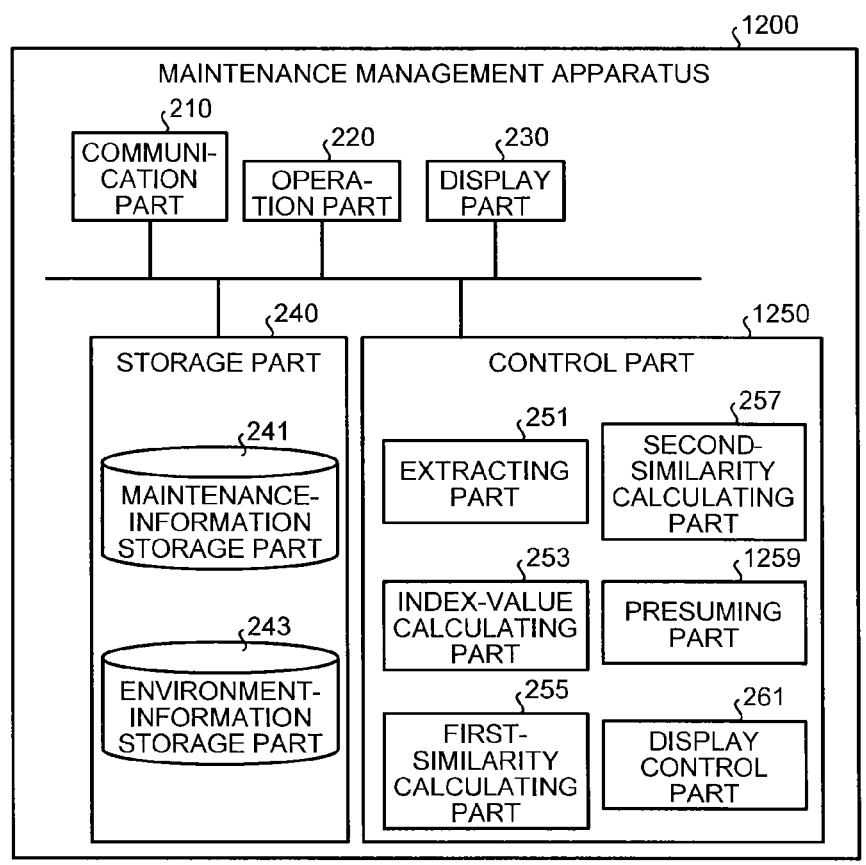
FIG. 11 is a diagram showing an example of stock information according to the second embodiment.
FIG. 12 a block diagram showing an example of a configuration of a maintenance management apparatus according to the second embodiment.

The stock-information storage part 1341 stores therein stock information on replacement parts in stock. FIG. 11 is a diagram showing an example of the stock information according to the second embodiment. In the example shown in FIG. 11, the stock information is collections of records (columns) in which a part name, a part ID, and the quantity of stock, etc. are associated. The part name denotes a name of a replacement part. The part ID denotes an ID of the replacement part. The quantity of stock denotes the number of the replacement parts in stock, and includes the quantity of stock in each service office and the total quantity of stock in all service offices.

The control part 1350 controls the parts included in the stock management apparatus 1300, and can be realized by a control device such as a CPU.

The control part 1350 manages stock information on replacement parts in stock by using the stock-information storage part 1341. For example, when new stock information or update of existing stock information has been input by an administrator of the stock management apparatus 1300 through the operation part 1320, the control part 1350 updates the stock information stored in the stock-information storage part 1341.

Furthermore, upon receipt of a request for stock information of a replacement part from the maintenance management apparatus 1200, the control part 1350 acquires the requested stock information from the stock-information storage part 1341 and returns the acquired stock information to the maintenance management apparatus 1200. For example, when a part ID has been input from the maintenance management apparatus 1200 through the communication part 1310, the control part 1350 acquires a record of stock information including the part ID from the stock information stored in the stock-information storage part 1341 and returns the acquired stock information to the maintenance management apparatus 1200.

FIG. 12 a block diagram showing an example of a configuration of the maintenance management apparatus 1200 according to the second embodiment. As shown in FIG. 12, the maintenance management apparatus 1200 differs in a presuming part 1259 of a control part 1250 from the maintenance management apparatus 200 according to the first embodiment.

The presuming part 1259 presumes a predetermined number of replacement parts having a high frequency of appearance among replacement parts of a maintenance target device to be replacement parts of the maintenance target device on the basis of replacement parts which are in stock and correspond to any of replacement parts that one or more reference devices used for elimination of the same phenomenon as that occurred in the maintenance target device by reference to the stock information indicating the stock of parts.

For example, the presuming part 1259 acquires records including serial numbers of the one or more reference devices by reference to maintenance information, and, with respect to each of values of replacement part IDs included in the acquired records, counts the number of records including the same value of replacement part ID, and then ranks (arranges) the replacement part IDs in descending order of a count value. Furthermore, the presuming part 1259 transmits the replacement part IDs included in the acquired records to the stock management apparatus 1300 through the communication part 210, and acquires records of stock information including the replacement part IDs from the stock management apparatus 1300, thereby acquiring the total quantity of stock in all service offices. Then, the presuming part 1259 deletes a replacement part ID of a replacement part of which the total quantity of stock is zero from the ranked (arranged) replacement part IDs.

Thus, the replacement part IDs of replacement parts which are in stock and correspond to any of the replacement parts that the one or more reference devices used for elimination of the same phenomenon as that occurred in the maintenance target device are arranged in descending order of the frequency of appearance, so that the presuming part 1259 presumes replacement parts indicated by a predetermined number of replacement part IDs having a high frequency of appearance to be replacement parts of the maintenance target device.

Figures 13, 14:
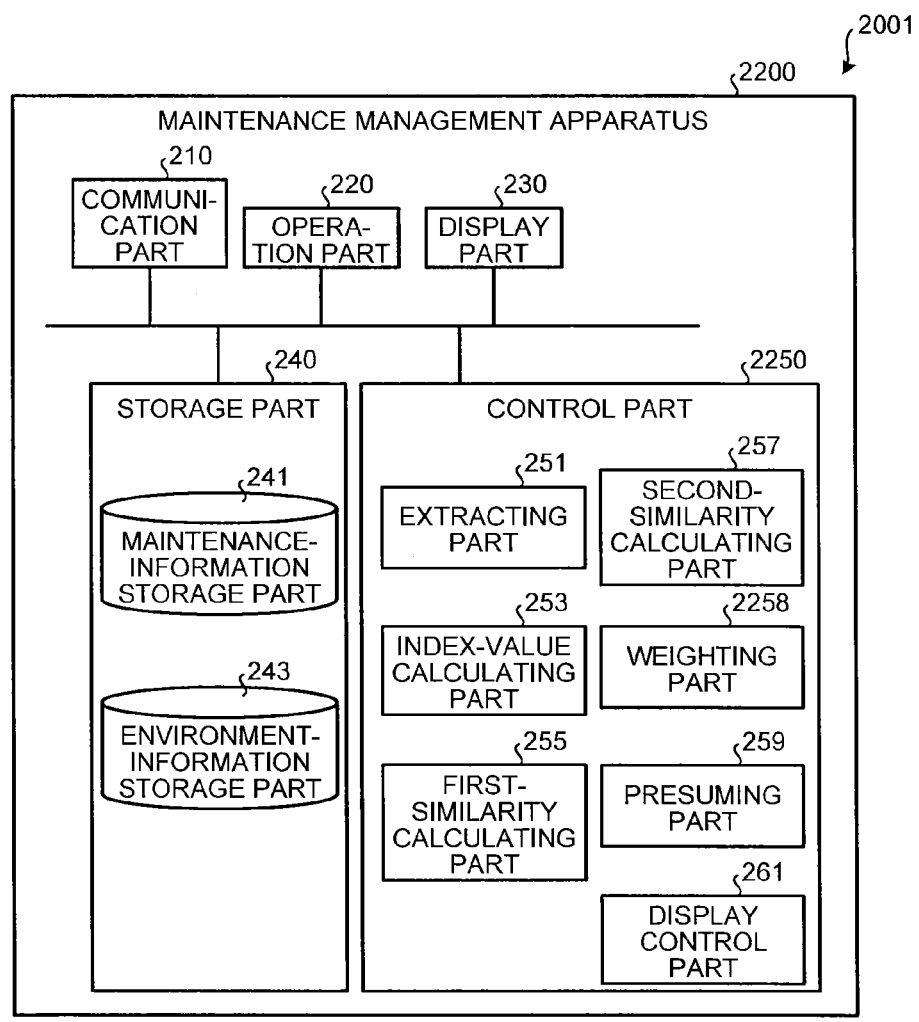
FIG. 13 is a diagram showing a display example of the stock of presumed replacement parts according to the second embodiment.
FIG. 14 is a block diagram showing an example of a configuration of a maintenance management apparatus according to a third embodiment.

Incidentally, the display control part 261 can be configured to display stock information of the presumed replacement parts as well as information about the replacement parts presumed by the presuming part 1259 on the display part 230. FIG. 13 is a diagram showing a display example of the stock of presumed replacement parts according to the second embodiment. In the example shown in FIG. 13, the display control part 261 displays, as stock information of each replacement part presumed by the presuming part 1259, a replacement part ID, a part name of a replacement part, the quantity of stock, and details of the stock quantity, etc. on the display part 230. Respective quantities of stock in service offices are displayed in the details of the stock quantity; it is preferable to display the quantities of stock in the service offices in the order from the nearest service office to a service point in which the maintenance target device has been installed. Incidentally, the screen shown in FIG. 13 is displayed when a replacement part ID or a part name of a replacement part has been selected through the screen shown in FIG. 7.

As described above, in the second embodiment, a replacement part for elimination of a phenomenon occurred in a maintenance target device is presumed among replacement parts in stock; therefore, a serviceman does not have to check whether the presumed replacement part is in stock, so that it is possible to reduce the serviceman workload.

Third Embodiment

In a third embodiment, there is explained an example where environment information is weighted. Points of difference from the first embodiment are mainly explained below, and a component having the same function as in the first embodiment is assigned the same name and reference numeral as in the first embodiment, and description of the component is omitted.

FIG. 14 is a block diagram showing an example of a configuration of a maintenance management apparatus 2200 of an information processing system 2001 according to the third embodiment. As shown in FIG. 14, the maintenance management apparatus 2200 differs from the maintenance management apparatus 200 according to the first embodiment in that a control part 2250 further includes a weighting part 2258.

The weighting part 2258 weights respective pieces of environment information of a maintenance target device and one or more devices extracted by the extracting part 251. Specifically, the weighting part 2258 weights elements included in the respective pieces of environment information of the maintenance target device and the one or more devices which have been acquired by the second-similarity calculating part 257 on the basis of weights on elements (temperature and humidity, etc.) included in environment information input by an administrator of the maintenance management apparatus 2200 through the operation part 220.

Incidentally, as for the weights on the elements included in the environment information, for example, if an element has a peculiar value higher or lower than a standard, a weight on the element is increased. By doing this, a peculiar environmental condition can be further emphasized.

Then, the second-similarity calculating part 257 calculates a second similarity which is the degree of similarity between the weighted environment information of the maintenance target device and the weighted environment information of each of the one or more devices.

As described above, in the third embodiment, it is possible to weight elements included in environment information, and therefore it is possible to further emphasize environment information of peculiar environment, such as high temperature, low temperature, high humidity, or low humidity, and to increase the accuracy of calculation of the second similarity.

Modifications

Incidentally, the present invention is not limited to the above-described embodiments, and various modifications can be made.

Modification 1

For example, in the above-described embodiments, devices extracted by the extracting part 251 can be devices in which the same phenomenon as that occurred in a maintenance target device had occurred within a predetermined period of time from present to past (for example, within the last one month).

Furthermore, for example, in the above-described embodiments, device information can include the number of printed sheets and number of operating days per predetermined period of time (for example, per month), and the index-value calculating part 253 can use the number of printed sheets and number of operating days at the point of occurrence of the same phenomenon as that occurred in the maintenance target device in calculation of respective index values of the one or more devices.

By doing this, the influence of a time lag between device information at the point of occurrence of the phenomenon and current device information can be eliminated.

Modification 2

There are described an example where the information processing system is composed of devices, the device management apparatus, and the maintenance management apparatus in the first and third embodiments and an example where the information processing system is composed of devices, the device management apparatus, the maintenance management apparatus, and the stock management apparatus in the second embodiment; however, the configuration of the information processing system is not limited to these, and the function of any apparatus composing the information processing system can be substituted by another apparatus.

Figure 15:
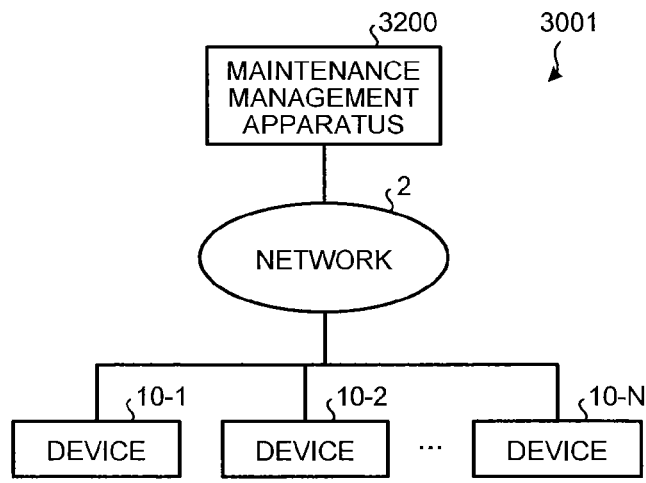
FIG. 15 is a block diagram showing an example of a configuration of an information processing system according to a modification 2.
Figure 16:
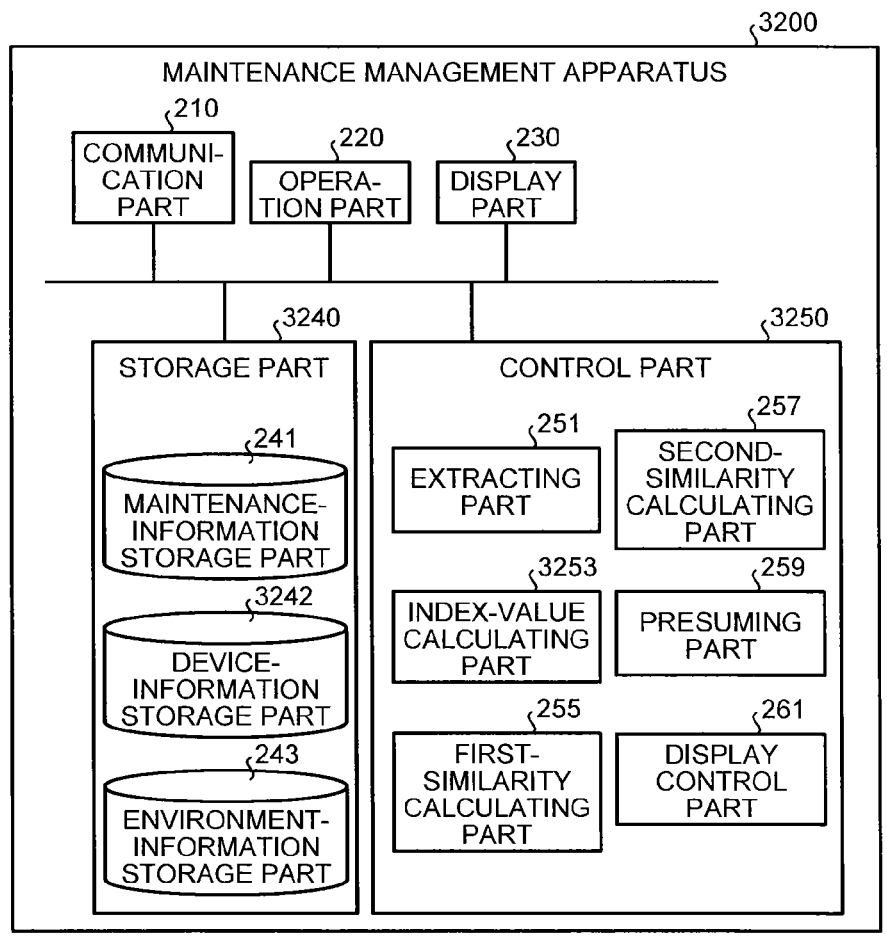
FIG. 16 is a block diagram showing an example of a configuration of a maintenance management apparatus according to the modification 2.

For example, like an information processing system 3001 shown in FIG. 15, a maintenance management apparatus 3200 can substitute for the function of the device management apparatus; in this case, as shown in FIG. 16, a storage part 3240 of the maintenance management apparatus 3200 includes a device-information storage part 3242, and a control part 3250 acquires device information from the devices 10-1 to 10-N and stores the acquired device information in the device-information storage part 3242, and an index-value calculating part 3253 acquires respective pieces of device information of a maintenance target device and one or more devices extracted by the extracting part 251 from the device-information storage part 3242.

Furthermore, in the above-described embodiments, there is described an example where the device management apparatus stores therein device information, the maintenance management apparatus stores therein maintenance information and environment information, and the stock management apparatus stores therein stock information; alternatively, at least any of these pieces of information can be stored in the outside (for example, on a cloud).

Hardware Configuration

Figure 17:
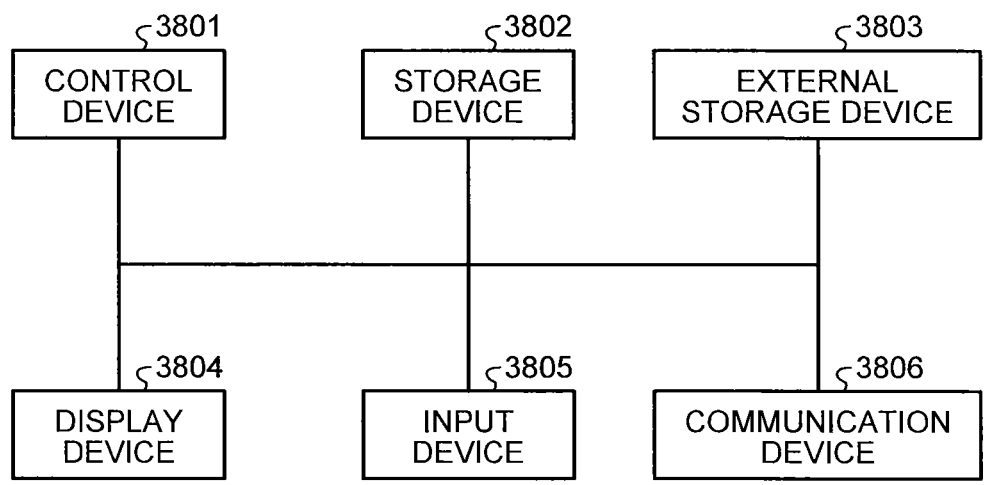
FIG. 17 is a diagram showing an example of a hardware configuration of apparatus according to any of the embodiments and modifications.

FIG. 17 is a diagram showing an example of a hardware configuration of the device management apparatus, the maintenance management apparatus, and the stock management apparatus according to any of the above-described embodiments and modifications (hereinafter, referred to as the apparatus according to any of the above-described embodiments and modifications).

The apparatus according to any of the above-described embodiments and modifications includes a control device 3801 such as a CPU, a storage device 3802 such as a ROM or a RAM, an external storage device 3803 such as an HDD, a display device 3804 such as a display, an input device 3805 such as a keyboard or a mouse, and a communication device 3806 such as a communication interface (I/F), and has a hardware configuration using a normal computer.

A program executed by the apparatus according to any of the above-described embodiments and modifications is stored in a non-transitory computer-readable recording medium, such as a CD-ROM, a CD-R, a memory card, a digital versatile disk (DVD), or a flexible disk (FD), in an installable or executable file format, and the storage medium is provided.

Furthermore, the program executed by the apparatus according to any of the above-described embodiments and modifications can be stored on a computer connected to a network such as the Internet, and the program can be provided by causing a user to download it via the network. Moreover, the program executed by the apparatus according to any of the above-described embodiments and modifications can be provided or distributed via a network such as the Internet. Furthermore, the program executed by the apparatus according to any of the above-described embodiments and modifications can be built into the ROM or the like in advance.

The program executed by the apparatus according to any of the above-described embodiments and modifications is composed of modules for realizing the above-described parts on a computer. A CPU as actual hardware reads out the program from an HDD, and executes the read program on a RAM, thereby the above-described parts are realized on a computer.

According to the present invention, it is possible to suppress the downtime due to a phenomenon occurred in a device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
an extracting part configured to extract one or more devices, from multiple managed object devices, in which a phenomenon as that occurred in a maintenance target device had occurred;
an index-value calculating part configured to acquire device information on a device state of the maintenance target device and to calculate an index value regarding the device state of the maintenance target device, and to acquire pieces of device information on respective device states of the one or more devices and to calculate index values regarding the respective device states of the one or more devices;
a first-similarity calculating part configured to calculate a first similarity between the index value of the maintenance target device and the index value of each of the one or more devices;

a second-similarity calculating part configured to acquire environment information on a usage environment of the maintenance target device and pieces of environment information on respective usage environments of the one or more devices, and to calculate a second similarity between the environment information of the maintenance target device and the environment information of each of the one or more devices; and a presuming part configured to determine one or more reference devices from among the one or more devices on the basis of the first and second similarities, and to presume a replacement part of the maintenance target device on the basis of replacement parts that the one or more reference devices used for elimination of the phenomenon.

2. The information processing system according to claim 1, wherein
the presuming part determines the one or more reference devices out of the one or more devices on the basis of a weighted average value of the first and second similarities.

3. The information processing system according to claim 2, wherein
a weight on the first similarity is greater than a weight on the second similarity.

4. The information processing system according to claim 2, wherein
the presuming part determines a predetermined number of devices having a high weighted average value among the one or more devices to be the one or more reference devices.

5. The information processing system according to claim 1, wherein
the presuming part presumes a predetermined number of replacement parts having a high frequency of appearance among the replacement parts that the one or more reference devices used for elimination of the phenomenon to be replacement parts of the maintenance target device.

6. The information processing system according to claim 1, wherein
the presuming part presumes a replacement part of the maintenance target device on the basis of replacement parts which are in stock and correspond to any of the replacement parts that the one or more reference devices used for elimination of the phenomenon with reference to stock information indicating parts in stock.

7. The information processing system according to claim 6, wherein
the presuming part presumes a predetermined number of replacement parts having a high frequency of appearance among the replacement parts which are in stock and correspond to any of the replacement parts that the one or more reference devices used for elimination of the phenomenon to be replacement parts of the maintenance target device.

8. The information processing system according to claim 1, further comprising a weighting part configured to weight the respective pieces of environment information of the maintenance target device and the one or more devices.

9. The information processing system according to claim 1, further comprising a maintenance-information storage part configured to store therein maintenance information in which device identifying information for identifying a device, phenomenon information indicating a phenomenon occurred in the device, and replacement-part identifying information for identifying a replacement part which was used for elimination of the phenomenon are associated, wherein
the extracting part extracts, as the one or more devices, a device indicated by device identifying information associated with phenomenon information indicating the phenomenon as that occurred in the maintenance target device by reference to the maintenance information, and
the presuming part presumes a replacement part of the maintenance target device by reference to the maintenance information on the basis of replacement parts indicated by pieces of replacement-part identifying information associated with respective pieces of device identifying information indicating the one or more reference devices.

10. The information processing system according to claim 1, further comprising a device-information storage part configured to store therein respective pieces of device information of the maintenance target device and the one or more devices, wherein
the index-value calculating part acquires the device information of the maintenance target device and the pieces of device information of the one or more devices from the device-information storage part.

11. The information processing system according to claim 1, further comprising an environment-information storage part configured to store therein respective pieces of environment information of the maintenance target device and the one or more devices, wherein
the second-similarity calculating part acquires the environment information of the maintenance target device and the pieces of environment information of the one or more devices from the environment-information storage part.

12. The information processing system according to claim 1, wherein
the maintenance target device and the one or more devices are image forming apparatuses, and
the device information includes at least a number of printed sheets and a number of operating days.

13. The information processing system according to claim 1, wherein
the environment information includes at least either temperature or humidity in usage environment.

14. An information processing apparatus comprising:
circuitry configured to
extract one or more devices, from multiple managed object devices, in which a phenomenon as that occurred in a maintenance target device had occurred,
acquire device information on a device state of the maintenance target device and calculate an index value regarding the device state of the maintenance target device, and acquire pieces of device information on respective device states of the one or more devices and calculate index values regarding the respective device states of the one or more devices,
calculate a first similarity between the index value of the maintenance target device and the index value of each of the one or more devices,
acquire environment information on a usage environment of the maintenance target device and pieces of environment information on respective usage environments of the one or more devices, and calculate a second similarity between the environment information of the maintenance target device and the environment information of each of the one or more devices, and determine one or more reference devices from among the one or more devices on the basis of the first and second similarities, and presume a replacement part of the maintenance target device on the basis of replacement parts that the one or more reference devices used for elimination of the phenomenon.

15. A method implemented by circuitry of an information processing apparatus, the method comprising steps of:
extracting one or more devices, from multiple managed object devices, in which a phenomenon as that occurred in a maintenance target device had occurred;
acquiring device information on a device state of the maintenance target device and calculating an index value regarding the device state of the maintenance target device, and acquiring pieces of device information on respective device states of the one or more devices and calculating index values regarding the respective device states of the one or more devices;
calculating a first similarity between the index value of the maintenance target device and the index value of each of the one or more devices;
acquiring environment information on a usage environment of the maintenance target device and pieces of environment information on respective usage environments of the one or more devices, and calculating a second similarity between the environment information of the maintenance target device and the environment information of each of the one or more devices; and
determining one or more reference devices from among the one or more devices on the basis of the first and second similarities, and presuming a replacement part of the maintenance target device on the basis of replacement parts that the one or more reference devices used for elimination of the phenomenon.

16. A non-transitory computer-readable recording medium including computer executable instructions, wherein the instructions, when executed by a computer, cause the computer to perform the method according to claim 15.

\* \* \* \* \*